(12) United States Patent
Douglas et al.

(10) Patent No.: US 10,009,370 B1
(45) Date of Patent: Jun. 26, 2018

(54) DETECTION AND REMEDIATION OF POTENTIALLY MALICIOUS FILES

(71) Applicant: EMC Corporation, Hopkinton, MA (US)

(72) Inventors: Kevin Douglas, Vienna, VA (US); Diptanu Das, Falls Church, VA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 186 days.

(21) Appl. No.: 15/057,631

(22) Filed: Mar. 1, 2016

(51) Int. Cl.
*H04L 29/00* (2006.01)
*H04L 29/06* (2006.01)
*G06F 21/56* (2013.01)

(52) U.S. Cl.
CPC .......... *H04L 63/145* (2013.01); *G06F 21/562* (2013.01); *G06F 21/563* (2013.01); *H04L 63/1425* (2013.01)

(58) Field of Classification Search
None
See application file for complete search history.

(56) References Cited

U.S. PATENT DOCUMENTS

| | | | | |
|---|---|---|---|---|
| 9,253,208 | B1 * | 2/2016 | Koshelev | H04L 63/1483 |
| 9,317,679 | B1 * | 4/2016 | Bhatkar | G06F 21/50 |
| 9,690,936 | B1 * | 6/2017 | Malik | G06F 21/562 |
| 2009/0070879 | A1 * | 3/2009 | Saika | G06F 21/566 |
| | | | | 726/24 |
| 2011/0078794 | A1 * | 3/2011 | Manni | G06F 21/566 |
| | | | | 726/23 |
| 2012/0260342 | A1 | 10/2012 | Dube et al. | |
| 2013/0097705 | A1 * | 4/2013 | Montoro | G06F 21/562 |
| | | | | 726/24 |
| 2013/0097706 | A1 * | 4/2013 | Titonis | G06F 21/56 |
| | | | | 726/24 |
| 2015/0281260 | A1 * | 10/2015 | Arcamone | H04L 63/1408 |
| | | | | 726/11 |
| 2017/0230388 | A1 * | 8/2017 | Pevny | G06F 21/552 |
| 2017/0300691 | A1 * | 10/2017 | Upchurch | G06F 21/563 |

OTHER PUBLICATIONS

Laskov, Pavel, and Nedim Šrndić. "Static detection of malicious JavaScript-bearing PDF documents." Proceedings of the 27th annual computer security applications conference. ACM, 2011.*
Nissim, Nir, et al. "Detection of malicious PDF files and directions for enhancements: a state-of-the art survey." Computers & Security 48 (2015): 246-266.*
Richard Costelloe, "Malware Analysis in an Operational Environment," The Open Web Application Security Project (OWASP), Feb. 22, 2013, 72 pages.

(Continued)

*Primary Examiner* — Madhuri Herzog
(74) *Attorney, Agent, or Firm* — Ryan, Mason & Lewis, LLP

(57) ABSTRACT

A method comprises obtaining a potentially malicious file, decoding the file to identify one or more code streams, processing each of the identified code streams to determine the presence of respective ones of a set of indicators of compromise, determining whether the file is malicious based on the presence of one or more of the indicators of compromise in the code streams, and modifying access by a given client device to the file responsive to determining that the file is malicious.

20 Claims, 12 Drawing Sheets

(56) References Cited

OTHER PUBLICATIONS

Hun-Ya Lock, "Using IOC (Indicators of Compromise) in Malware Forensics," SANS Institute InfoSec Reading Room, Feb. 21, 2013, 58 pages.

D. Plohmann et al., "Patterns of a Cooperative Malware Analysis Workflow," 5th International Conference on Cyber Conflict (CyCon), Jun. 4-7, 2013, 18 pages, Tallinn, Estonia.

* cited by examiner

```
▼ vbaMacroContainer: {}
  ▼ vbaEmbeddedObject: {}
      name: "embedded VBA",
    ▼ vbaCode: {}
        "Лист3": "Attribute VB_Name = \"●●●●3\"\r\nAttribute VB_Base = \"0{00020820-0000-0000-C000-000000000046}\"\r\nAttribute
        VB_GlobalNameSpace = False\r\nAttribute VB_Creatable = False\r\nAttribute VB_PredeclaredId = True\r\nAttribute VB_Exposed = True\r
        \nAttribute VB_TemplateDerived = False\r\nAttribute VB_Customizable = True\r\n\r\n",
        "Лист2": "Attribute VB_Name = \"●●●●2\"\r\nAttribute VB_Base = \"0{00020820-0000-0000-C000-000000000046}\"\r\nAttribute
        VB_GlobalNameSpace = False\r\nAttribute VB_Creatable = False\r\nAttribute VB_PredeclaredId = True\r\nAttribute VB_Exposed = True\r
        \nAttribute VB_TemplateDerived = False\r\nAttribute VB_Customizable = True\r\n\r\n",
        "ЭтаКнига": "Attribute VB_Name = \"●●●●●●●●\"\r\nAttribute VB_Base = \"0{00020819-0000-0000-C000-000000000046}\"\r\nAttribute
        VB_GlobalNameSpace = False\r\nAttribute VB_Creatable = False\r\nAttribute VB_PredeclaredId = True\r\nAttribute VB_Exposed = True\r
        \nAttribute VB_TemplateDerived = False\r\nAttribute VB_Customizable = True\r\nPrivate Sub Workbook_Open()\r\nGoodBadStyles False, \"\",
        \"\", \"\", \"\", \"\"\r\nBadTorStyles \"\", \"\", \"\", \"\", \"\", \"\"\r\nDeleteContentControlPC
        \r\nMacmillanStyleReport\r\nCheckPrevStyle \"\", \"\", \"\", \"\", \"\", \"\"\r\n\r\nCheckPrev2Paras \"\", \"\", \"\", \"\", \"\", \"\"\r\nCheckPrev2Paras \"\", \"\", \"\", \"\", \"\", \"\"
        \r\nCheckPrev2Paras \"\", \"\", \"\", \"\", \"\"\r\n\r\nEnd Sub\r\n\r\nSub BookmakerRegs()\r\nIf CheckSave = True Then\r\n Exit Sub\r\n End If\r\n
        Application.ScreenUpdating = False\r\n Dim currentStatusBar As Boolean\r\n currentStatusBar = Application.DisplayStatusBar\r\n
        Application.DisplayStatusBar = True\r\n Dim arrStories() As Variant\r\n arrStories = StoryArray\r\n Dim sglPercentComplete As Single\r\n
        Dim strStatus As String\r\n Dim strTitle As String\r\n Dim funArray() As String\r\n ReDim funArray(1 To 10)\r\n funArray(1) = \"* Is this
```

```
Print #FileNumber, "Set objADOStream = C" + "reateO" + "bject(" + Chr(34) + "ADODB.Stream" + Chr(34) + ")"
Print #FileNumber, "objADOStream.Open "
Print #FileNumber, "objADOStream.Type = 1"
Print #FileNumber, "objADOStream.Write objXMLHTTP.Re" + "sponse" + "Body "
Print #FileNumber, "objADOStream.Position = 0 "
Print #FileNumber, "objADOStream.SaveToFile strTecation "
Print #FileNumber, "objADOStream.Close "
Print #FileNumber, "Set objADOStream = Nothing "
Print #FileNumber, "End if "
Print #FileNumber, "Set objXMLHTTP = Nothing"
Print #FileNumber, "Set objShell = C" + "reate" + "O" + "bject(" + Chr(34) + "W" + "S" + "cript." + "S" + "hell" + Chr(34) + ")"
Close #FileNumber
```
— 700

```
Print #FileNumber, "Set objADOStream = CreateObject("ADODB.Stream") "
Print #FileNumber, "objADOStream.Open "
Print #FileNumber, "objADOStream.Type = 1"
Print #FileNumber, "objADOStream.Write objXMLHTTP.ResponseBody "
Print #FileNumber, "objADOStream.Position = 0 "
Print #FileNumber, "objADOStream.SaveToFile strTecation "
Print #FileNumber, "objADOStream.Close "
Print #FileNumber, "Set objADOStream = Nothing "
Print #FileNumber, "End if "
Print #FileNumber, "Set objXMLHTTP = Nothing"
Print #FileNumber, "Set objShell = CreateObject("WScript.Shell")"
Close #FileNumber
```
— 702

FIG. 9

```
{
  ruleKey: "com.netwitness.malware.rules.static.oless.vbacode.present",
  ruleText: "Consists of VBA Code",
  value: 20.0,
  messageKey: "com.netwitness.malware.rules.oless.reason.unexpected",
  messageText: "File: {%s}, md5: {%s}, sha1: {%s}, vbaCode: {%s}",
  parameters: [
    "",
    "5604106a9619216bf3a3cf04194e1223",
    "e8334005012260a918610a618c531065e935b0ae1",
    "VBA Code Present"
  ],
  highConfidence: false
},
```

```
▶ {
    ruleKey: "com.netwitness.malware.rules.static.oless.vbacode.automaticScript.present",
    ruleText: "VBA Code contains Automatic scripts",
    value: 40.0,
    messageKey: "com.netwitness.malware.rules.oless.reason.unexpected",
    messageText: "File: {%s}, md5: {%s}, sha1: {%s}, vbaCode: {%s}",
  ▶ parameters: [
        "",
        "5604106a9619216bf3a3cf04194e1223",
        "e8334005012600918610a618c531065e935b0ae1",
        "Workbook_Open"
    ],
    highConfidence: false
  };
```

```
{
  ruleKey: "com.netwitness.malware.rules.static.oless.vbacode.webActivity.present",
  ruleText: "VBA Code contains Web Activity",
  value: 60.0,
  messageKey: "com.netwitness.malware.rules.oless.reason.unexpected",
  messageText: "File: {%s}, md5: {%s}, sha1: {%s}, vbaCode: {%s}, decodedUrl: {%s}",
  parameters: [
    "",
    "5604106a9619216bf3a3cf04194e1223",
    "e833400501260a918610a618c531065e935b0ae1",
    "Microsoft.XMLHTTP",
    http://iwcleaner.co.uk/8i65h4g53/o97i76u54.exe
  ],
  highConfidence: true
}
```
~1100

FIG. 12

```
▶ {
    ruleKey: "com.netwitness.malware.rules.static.oless.vbacode.writeFilesToDisk.present",
    ruleText: "VBA Code writing files to disk",
    value: 70.0,
    messageKey: "com.netwitness.malware.rules.oless.reason.unexpected",
    messageText: "File: {%s}, md5: {%s}, sha1: {%s}, vbaCode: {%s}",
  ▶ parameters: [
        "",
        "5604106a9619216bf3a3cf04194e1223",
        "e8334005012600918610a618c531065e935b0ae1",
        "Adodb.Stream"
    ],
    highConfidence: true
  }
```

```
▶ {{
    ruleKey: "com.netwitness.malware.rules.static.oless.vbacode.launchingexe.present",
    ruleText: "VBA Code launching exe's",
    value: 80.0,
    messageKey: "com.netwitness.malware.rules.oless.reason.unexpected",
    messageText: "File: {%s}, md5: {%s}, sha1: {%s}, vbaCode: {%s}, url: {%s}",
  ▶ parameters: [
      "",
      "5604106a9619216bf3a3cf04194e1223",
      "e8334005012600918610a618c531065e935b0ae1",
      "Shell.Application",
      http://iwcleaner.co.uk/8i65h4g53/o97i76u54.exe
    ],
    highConfidence: true
  }}
```

1300

DETECTION AND REMEDIATION OF POTENTIALLY MALICIOUS FILES

FIELD

The field relates generally to security, and more particularly to detection of security threats.

BACKGROUND

Various entities are subject to different types of security threats. Some security threats relate to networking and computer security for client devices used by members of an entity, such as a business, organization or other enterprise. Malware droppers are an example of such security threats. Malware droppers contain malicious code that is designed to download and install or drop malware onto a target machine such as a client device used by members of an entity. Malware dropper infections may happen during an early stage, such as a delivery phase, of a Cyber Kill Chain attack model.

SUMMARY

Illustrative embodiments of the present invention provide techniques for detection and remediation of potentially malicious files, such as malware droppers. Such techniques in some embodiments advantageously permit for detection of zero-day malware droppers using static analysis avoiding a need for dynamic analysis such as executing or opening a potentially malicious file. Accordingly, a network security system used in detection and remediation of malware droppers can exhibit improved performance as well as enhanced security against attacks including malware droppers.

In one embodiment, a method comprises obtaining a potentially malicious file, decoding the file to identify one or more code streams, processing each of the identified code streams to determine the presence of respective ones of a set of indicators of compromise, determining whether the file is malicious based on the presence of one or more of the indicators of compromise in the code streams, and modifying access by a given client device to the file responsive to determining that the file is malicious. The method is performed by at least one processing device comprising a processor coupled to a memory.

The processing device may be implemented, for example, in one or more network devices in a computer network, in a security operations center of an enterprise, or in a security analytics system or other type of network security system associated with the computer network or an enterprise.

These and other illustrative embodiments include, without limitation, methods, apparatus, networks, systems and processor-readable storage media.

BRIEF DESCRIPTION OF THE DRAWINGS

FIG. 6 shows an example of a code stream decoded by the stream decoding engine of FIG. 5.

FIG. 7 shows an example of code before and after processing in the anti-evasion engine of FIG. 5.

FIG. 9 shows an indicator of compromise detecting the presence of designated types of code in an illustrative embodiment.

FIG. 10 shows an indicator of compromise detecting code with auto-launch capability in an illustrative embodiment.

FIG. 11 shows an indicator of compromise detecting network download capability in an illustrative embodiment.

FIG. 12 shows an indicator of compromise detecting the ability to write files to disk in an illustrative embodiment.

FIG. 13 shows an indicator of compromise detecting the ability to execute files from disk in an illustrative embodiment.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
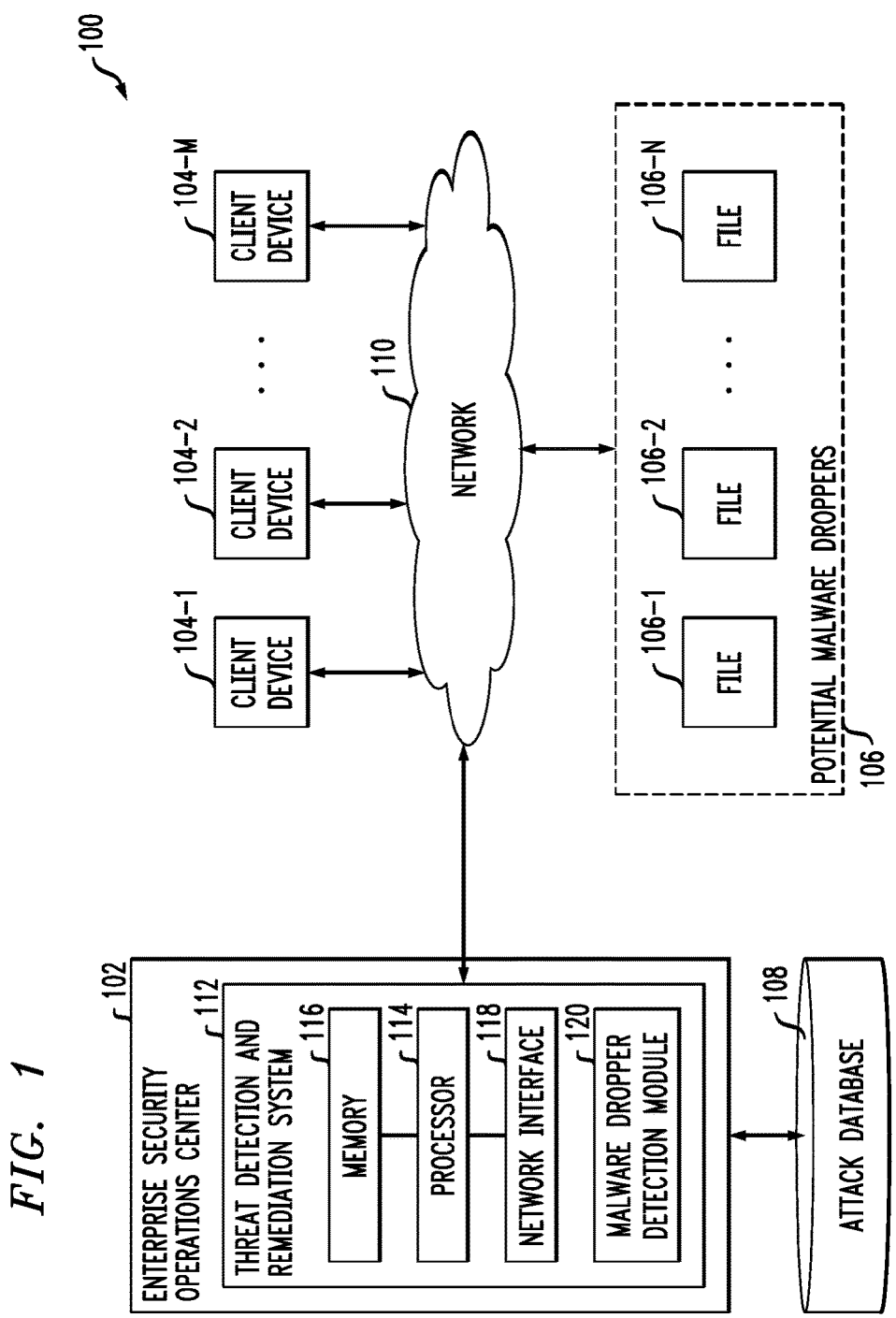
FIG. 1 is a block diagram of an information processing system for detecting and remediating malware droppers in an illustrative embodiment of the invention.

FIG. 1 shows a computer network 100 configured in accordance with an illustrative embodiment of the invention. The computer network 100 comprises an enterprise security operations center (SOC) 102 and a plurality of client devices 104-1, 104-2, . . . 104-M, collectively referred to herein as client devices 104. The client devices 104 are coupled to a network 110, where the network 110 in this embodiment is assumed to represent a sub-network or other related portion of the larger computer network 100. Accordingly, elements 100 and 110 are both referred to herein as examples of "networks" but the latter is assumed to be a component of the former in the context of the FIG. 1 embodiment. Also coupled to the network 110 is a set of potential malware droppers including potentially malicious files 106-1, 106-2, . . . 106-N that may be transmitted over network 110 to one or more the client devices 104.

Malware droppers are a type of potentially malicious file. While various embodiments are described below in the context of malware droppers, embodiments are not limited solely to use in detecting and remediating malware droppers. Instead, embodiments may more generally detect and remediate various other types of potentially malicious files. It should be further noted that the term "potentially malicious file" is intended to be construed broadly to cover various types of items which may contain malicious code including but not limited to emails, attachments, links, web pages, documents and other types of files.

The client devices 104 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The client devices 104 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

The network 110 is assumed to comprise a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

The enterprise SOC 102 has an associated attack database 108 configured to store and record information relating to threats and attacks including malware droppers. The attack database 108 may, in some embodiments, more particularly store a blacklist of known malware droppers or other information characterizing known malware droppers such as previous patterns of attack used by known malware droppers. In other embodiments, various additional or alternative information may be stored in attack database 108, such as a whitelist of acceptable files or other information characterizing potentially malicious files.

The attack database 108 in some embodiments is implemented using one or more storage devices associated with the enterprise SOC 102. Such storage devices may comprise, for example, storage products such as VNX® and Symmetrix VMAX®, both commercially available from EMC Corporation of Hopkinton, Massachusetts. A variety of other storage products may be utilized to implement at least a portion of the storage devices associated with the enterprise SOC 102.

Although not explicitly shown in FIG. 1, one or more input-output devices such as keyboards, displays or other types of input-output devices may be used to support one or more user interfaces to the enterprise SOC 102, as well as to support communication between the enterprise SOC 102 and other related systems and devices not explicitly shown.

In the present embodiment, alerts or notifications generated by a threat detection and remediation system 112 of the enterprise SOC 102 are provided over network 110 to client devices 104, or to a system administrator, information technology (IT) manager, or other authorized personnel via one or more security agents. Such security agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 110 with the enterprise SOC 102 and the threat detection and remediation system 112. For example, a given security agent may comprise a mobile telephone equipped with a mobile application configured to receive alerts from the enterprise SOC 102 or the threat detection and remediation system 112 and to provide an interface for the security agent to select particular remedial measures for responding to the alert or notification. Examples of such remedial measures may include blocking access to one or more malicious files, removing malicious files from one or more of the client devices 104, requiring malicious files to be run in a sandboxed or other protected environment on one or more of the client devices 104, requiring user input or authentication to obtain or run malicious files, etc.

It should be noted that a "security agent" as the term is generally used herein may comprise an automated entity, such as a software entity running on a processing device. Accordingly, a security agent need not be a human entity.

As shown in FIG. 1, the enterprise SOC 102 comprises threat detection and remediation system 112. As will be described in further detail below, the threat detection and remediation system 112 is configured to obtain potentially malicious files 106, to decode the potentially malicious files to identify one or more code streams therein, to process the identified code streams to determine the presence of respective ones of a set of indicators of compromise (IOCs), to determine whether respective ones of the potentially malicious files 106 are malicious based on the presence of the IOCs, and to modify access by one or more of the client devices 104 responsive to determining that one or more of the potentially malicious files 106 are malicious.

It is important to note that potential malware droppers such as the potentially malicious files 106 may take a number of different forms. For example, a malware dropper may take the form of a standalone executable or a document format that supports embedded scripting capabilities. Document formats supporting embedded scripting capabilities include but are not limited to Portable Document Format (PDF), Flash, and Microsoft® Office documents. When a malware dropper taking the form of a standalone executable is run, malicious code is automatically executed, downloading malware from a hosting site and installing and executing the malware on a target device. Similarly, malware droppers taking the form of document formats supporting embedded scripting capabilities will execute malicious code on opening the document.

Although shown as an element of the enterprise SOC 102 in this embodiment, the threat detection and remediation system 112 in other embodiments can be implemented at least in part externally to the enterprise SOC 102, for example, as a stand-alone server, set of servers or other type of system coupled to the network 110. In some embodiments, the threat detection and remediation system 112 may be implemented at least in part within one or more of the client devices 104.

The threat detection and remediation system 112 in the FIG. 1 embodiment is assumed to be implemented using at least one processing device. Each such processing device generally comprises at least one processor and an associated memory, and implements one or more functional modules for controlling certain features of the threat detection and remediation system 112.

More particularly, the threat detection and remediation system 112 in this embodiment comprises a processor 114 coupled to a memory 116 and a network interface 118.

The processor 114 illustratively comprises a microprocessor, a microcontroller, an application-specific integrated circuit (ASIC), a field-programmable gate array (FPGA) or other type of processing circuitry, as well as portions or combinations of such circuitry elements.

The memory 116 illustratively comprises random access memory (RAM), read-only memory (ROM) or other types of memory, in any combination. The memory 116 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 118 allows the threat detection and remediation system 112 to communicate over the network 110 with the client devices 104, and illustratively comprises one or more conventional transceivers.

The processor 114 further comprises a malware dropper detection module 120. The malware dropper detection module 120 is configured to obtain potentially malicious files, to decode the files to identify code streams, to process the identified code streams to determine the presence of respective IOCs, to determine whether potentially malicious files are malicious, and to modify access by one or more of client devices 104 to malicious files. This arrangement described above advantageously permits the threat detection and remediation system 112 to detect zero-day malware droppers, or malware droppers that have never been seen before, using static analysis avoiding a need for dynamic analysis such as executing or opening a potentially malicious file. Accordingly, the threat detection and remediation system 112 can exhibit improved performance as well as enhanced security against attacks including malware droppers. Additional details regarding the malware dropper detection module 120 will be described in further detail below with respect to FIGS. 2-13.

It is to be appreciated that the particular arrangement of the enterprise SOC 102, threat detection and remediation system 112 and malware dropper detection module 120 illustrated in the FIG. 1 embodiment is presented by way of example only, and alternative arrangements can be used in other embodiments. As discussed above, for example, the enterprise SOC 102, threat detection and remediation system 112 and/or malware dropper 120 may in some embodiments be implemented internal to one or more of the client devices 104. As another example, the functionality associated with the malware dropper detection module 120 can be separated across multiple modules possibly implemented with multiple distinct processors.

At least portions of the malware dropper detection module 120 may be implemented at least in part in the form of software that is stored in memory 116 and executed by processor 114.

It is to be understood that the particular set of elements shown in FIG. 1 for detection and remediation of malware droppers is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 112 may be implemented external to enterprise SOC 102, such that the enterprise SOC 102 can be eliminated.

In some embodiments, the threat detection and remediation system 112 may be part of or otherwise associated with a system other than the enterprise SOC 102, such as, for example, a critical incident response center (CIRC).

Additionally or alternatively, the threat detection and remediation system 112 can be part of or incorporate an otherwise conventional security analytics system, such as the RSA Security Analytics system commercially available from RSA, The Security Division of EMC Corporation of Hopkinton, Massachusetts.

Other embodiments can implement the threat detection and remediation system 112 as part of or in conjunction with a security information and event management (SIEM) system, such as the enVision° platform, also commercially available from RSA. Such an SIEM system is also considered another possible example of a "network security system" as that term is broadly used herein.

Security threats and attacks based on malware droppers are increasing in amount. In particular, Microsoft® Office-based malware droppers are becoming increasingly common. Such malware droppers may be attached to seemingly benign emails sent to targets within an enterprise considered likely to unsuspectingly open the attachment and allow the malware dropper to successfully infect the enterprise with malware. Many malware droppers are successful in evading security controls on email servers and antivirus scanners, allowing users to receive the email and save malware droppers to disk. Once a particular malware dropper gains enough visibility in the security community, antivirus vendors may update their signatures or blacklists so as to detect the new malware dropper. The signature update cycle, however, may be measured in days or weeks rather than seconds. Thus, detection of new malware droppers may only occur after an initial spike of emails has occurred and most users have already been exposed.

While the above scenario represents a typical malware dropper-based attack, various other types of malware dropper-based attacks are possible. For example, users may be exposed to malware droppers by visiting websites rather than via their email. Users may also be exposed to malware droppers from unknown software. As an example, many smartphone application marketplaces can contain new software that may include malware droppers. Various other types of malware dropper-based attacks are possible.

Illustrative embodiments utilize detection techniques that are extremely reliable at detection zero-day malware droppers without relying on signature patterns discovered by previously examining the malware dropper. For example, such techniques do not rely on file hashes or fuzzy hashes of selected parts or portions of the malware dropper. Some embodiments are extremely accurate at detecting different techniques or mechanisms that malware droppers typically use to achieve their goals of installing malware on a target device. Such techniques and mechanisms include but are not limited to networking connecting to a host site, writing to disk, executing files from disk, etc. Some embodiments also utilize static analysis of potentially malicious files which do not require dynamic analysis such as executing or opening the potentially malicious files.

Figure 2:
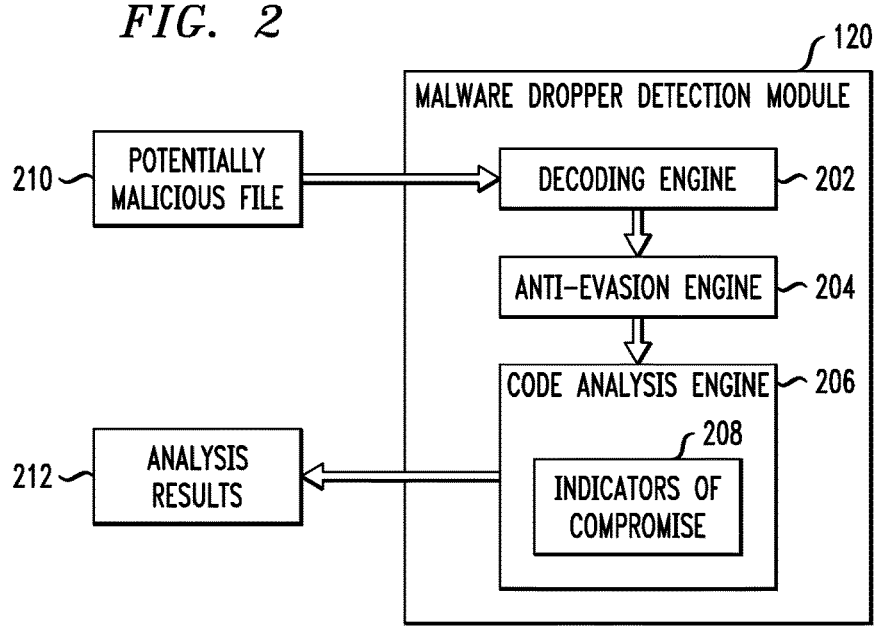
FIG. 2 shows a detailed view of the malware dropper detection module of FIG. 1.

FIG. 2 shows a detailed view of the malware dropper detection module 120 of threat detection and remediation system 112. As shown in FIG. 2, the malware dropper detection module 120 includes a decoding engine 202, an anti-evasion engine 204 and a code analysis engine 206. The code analysis engine 206 includes IOCs 208. The malware dropper detection module 120 is configured to obtain a potentially malicious file 210, process the potentially malicious file 210 using the decoding engine 202, anti-evasion engine 204 and code analysis engine 206, and to provide analysis results 212. The analysis results 212 may be utilized to determine whether to treat the potentially malicious file 210 as a malicious file and modify access by the client devices 104 to that file.

In the FIG. 2 embodiment, the malware dropper detection module 120 utilizes layered components for detecting malware droppers. The decoding engine 202 obtains the potentially malicious file, and decodes the file to identify code streams embedded in the potentially malicious file 210. The potentially malicious file 210 may be, for example, an Object Linking and Embedding Structure Storage (OLESS) document or an Office Open Extensible Markup Language (OOXML) document containing one or more Visual Basic for Application (VBA) scripting streams. The potentially malicious file may alternatively be a standalone executable or other document format that supports embedded scripting capabilities.

The anti-evasion engine 204 de-obfuscates the identified code streams to neutralize evasion techniques applied by malware authors. Examples of de-obfuscation techniques will be described in further detail below in conjunction with FIGS. 4, 5 and 7.

The code analysis engine 206 analyzes cleansed or de-obfuscated code streams to identify common techniques used by malware authors. This analysis, in some embodiments, includes checking for respective ones of a set of IOCs 208. The code analysis engine 206 provides analysis results 212, utilized to determine whether the potentially malicious file 210 is in fact malicious. Determining that a file is malicious may, in some cases, include determining that the potentially malicious file 210 is deemed too risky even though the potentially malicious file 210 is not in fact a malware dropper or other security threat. For example, the threat detection and remediation system 112 may be customized to adjust thresholds used for identifying potentially malicious files as threats. To err on the side of caution, relatively low detection thresholds may be used such as requiring detection of the presence of only one or a few of the set of IOCs 208. In a more permissive arrangement, a relatively high detection threshold may require detecting the presence of all or most of the set of IOCs 208. Various other arrangements are possible, including arrangements in which different ones of the IOCs 208 are assigned different weights as will be discussed in further detail below.

Figure 3:
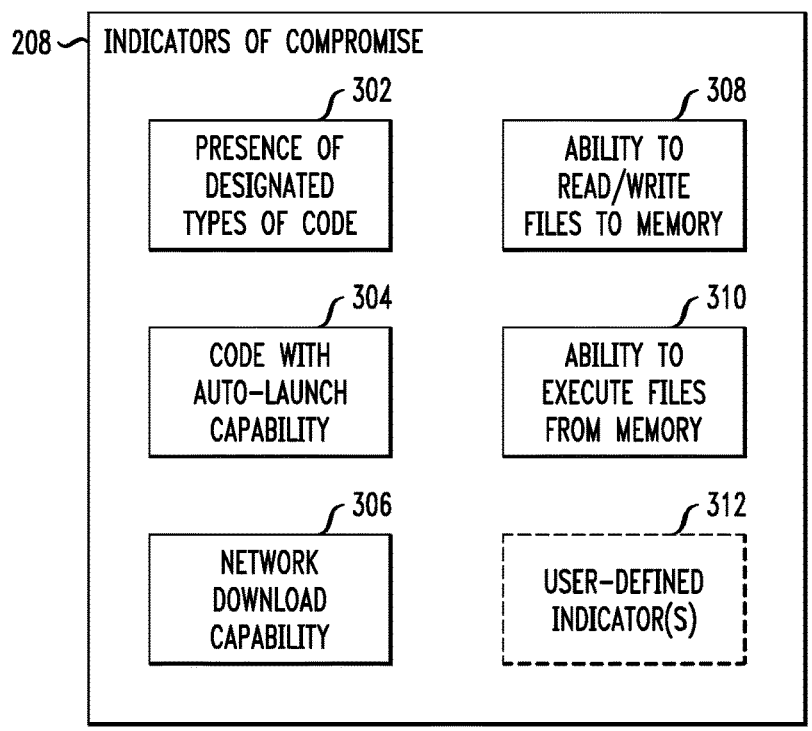
FIG. 3 shows a detailed view of exemplary indicators of compromise used in the code analysis engine of FIG. 2.

FIG. 3 shows examples of IOCs which may be included in the set of IOCs 208. FIG. 3 particularly shows IOCs 302, 304, 306, 308, 310 and 312.

IOC 302 checks for the presence of one or more designated types of code. In some embodiments, IOC 302 may check for VBA code or other types of executable code. A database such as attack database 108 may store a set of code types to check for and may contain a blacklist of code types which would trigger IOC 302, a whitelist of code types which would not trigger IOC 302, or both. Different weights may be assigned to IOC 302 based on the type of code and its presence on the blacklist or whitelist. For example, a lowest weight may be assigned to code types on the whitelist, an intermediate weight may be assigned to unknown code types not on the whitelist or blacklist, and a highest weight may be assigned to code types on the blacklist. In other embodiments, weights may be assigned differently. For example, in some embodiments both unknown code types and code types on the blacklist may be assigned a highest weight. In other embodiments, unknown code types may be assigned a higher weight than code types on the blacklist.

IOC 304 checks for code with auto-launch capability. As an example, the IOC 304 may check VBA scripts or other executable code for commands which automatically launch code without user intervention or knowledge. In some embodiments, the IOC 304 may be preprogrammed with knowledge of a set of commands with auto-launch capability. In other embodiments, the IOC 304 may prompt for user input of specific commands to check for, or obtain such commands from a database such as attack database 108. Similar to IOC 302 discussed above, the database may contain a whitelist and/or blacklist of specific commands. Different weights may be assigned to IOC 304 based on whether a command is on the whitelist, the blacklist or neither. For example, a lowest weight may be assigned to commands on the whitelist, while an intermediate weight is assigned to commands not on the whitelist or the blacklist, and a highest weight is assigned to commands on the blacklist. In other embodiments, weights may be assigned differently, such as using a highest weight for commands not on the whitelist or blacklist.

IOC 306 checks for code with network download capability. Network download capability may refer to code capable of downloading content from a host website, from another device on a network, from a device outside an entity network such as outside a corporate intranet, etc. In some embodiments, a database such as attack database 108 maintains a whitelist, table or other representation of trusted network locations which would not necessarily trigger IOC 306. Alternatively or additionally, the database may contain a blacklist of network locations which do trigger IOC 306. Different weights may be assigned to IOC 306 based on the location from which content is downloaded. For example, a lowest weight may be assigned if code is detected that seeks to download content from a source on the whitelist, an intermediate weight may be assigned if code is detected that seeks to download content from an unknown source, and a highest weight may be assigned if code is detected that seeks to download content from a source on the blacklist. In other embodiments, weights may be assigned differently such as assigning a same weight for code that seeks to download content from sources on the blacklist and from unknown sources or assigning a highest weight to code that seeks to download from unknown sources and assigning an intermediate weight to code that seeks to download from blacklisted sources. The IOC 306 may more particularly check for network download capability by checking for the presence of ActiveX controls indicating that the potentially malicious file is capable of downloading content from a network such as a host site.

IOC 308 checks for code with the ability to read from or write to a memory. In some embodiments, IOC 308 checks for the presence of ActiveX controls used to read from or write content to a disk or other memory. Again, an attack database such as attack database 108 may contain a whitelist, table or other representation of trusted or acceptable directories or other storage locations which would not necessarily trigger IOC 308. The database may alternately or additionally contain a blacklist of untrusted directories or storage locations. Similar to the IOCs 302, 304 and 306 discussed above, different weights may be assigned to IOC 308 based on whether a directory or storage location is on one of the whitelist and the blacklist. For example, a highest weight may be assigned to directories or storage locations on the blacklist, while intermediate weights are assigned to directories or storage locations not on the blacklist or whitelist, and a lowest weight is assigned to directories or storage locations on the whitelist. Again, weights may be assigned in other manners such as using the same weight for blacklisted storage locations and unknown storage locations or using a highest weight for unknown storage locations and an intermediate weight for blacklisted storage locations.

IOC 310 checks for code with the ability to execute one or more other files from memory. As an example, the IOC 310 may check for the presence of ActiveX controls allowing the potentially malicious file to run, execute or otherwise start other programs, scripts or files from a disk, network location or other memory. Once again, a database such as attack database 108 may contain a whitelist or blacklist of particular directories or storage locations. If code seeks to execute one or more files from a directory or storage location on the whitelist, a relatively low weight may be assigned. If code seeks to execute one or more files from a directory or storage location on the blacklist, a relatively high weight may be assigned. If code seeks to execute one or more files from a directory or storage location not on the whitelist or blacklist, an intermediate weight may be assigned. In other embodiments, weights may be assigned differently such as using the same weight for blacklisted storage locations and unknown storage locations or using a highest weight for unknown storage locations and an intermediate weight for blacklisted storage locations.

IOC 312 is optionally used and checks for one or more user-defined IOCs. The malware dropper detection module 120 may be customized for use in a particular environment at least in part by allowing users such as an administrator of the threat detection and remediation system 112 to define specific IOCs for a particular entity. As an example, a given entity may have certain characteristics and particular IOCs may be designed to protect against known vulnerabilities associated with such characteristics. Consider an entity that uses a particular operating system (OS) on its computers that is vulnerable to a specific type of attack, or an entity that uses particular devices or storage arrangements vulnerable to specific types of attack. User-defined IOCs may be used to check against such vulnerabilities. In some cases, this may be include defining whitelists and blacklists used by various other ones of the IOCs 208 described above. As another example, a given entity may supplement the above-described IOCs with general checks used in a signature-based static analysis of a file, code or portion of code. More generally, user-defined IOCs 312 may be designed to check for particular techniques or actions commonly used by malware droppers or other malicious files in addition to the specific examples discussed above.

An exemplary process for detection and remediation of malware droppers will now be described in more detail with reference to the flow diagram of FIG. 4. It is to be understood that this particular process is only an example, and that additional or alternative processes for detection and remediation of malware droppers can be carried out in other embodiments.

In this embodiment, the process includes steps 400 through 410. These steps are assumed to be performed by the processor 114 of the threat detection and remediation system 112 utilizing malware dropper detection module 120. The process begins with step 400, obtaining a potentially malicious file from a client device, such as one of client devices 104 of users associated with an enterprise. The client devices 104 may be computing or other processing devices utilized by the employees, customers, partners or other users associated with the enterprise. For example, the threat detection and remediation system 112 may be designed to protect an enterprise from malware droppers by monitoring activity of devices utilized by that enterprise's employees. As another example, the threat detection and remediation system 112 may provide a service which customers or partners of an enterprise may register or otherwise sign up for so as to receive protection from malware droppers. Thus, in some embodiments the threat detection and remediation system 112, and more generally the enterprise SOC 102, may be associated with one enterprise while the client devices 104 being monitored are associated with a different enterprise.

Obtaining the potentially malicious file in step 400 may in some cases involving receiving a request from one of the client device 104 to scan or check the potentially malicious file. In other cases, obtaining the potentially malicious file in step 400 may involve intercepting or filtering network communications such as Internet downloads or emails of the client devices 104. One or more application programming interfaces (APIs) of the client devices 104 may be configured to interact with threat detection and remediation system 112 so as to provide or notify the threat detection and remediation system 112 when potentially malicious files are download, copied, or otherwise stored or made available on client devices 104.

In some embodiments, the obtaining in step 400 includes monitoring only certain activity of the client devices 104. As an example, the threat detection and remediation system 112 may only check files from unknown sources or from web browsing or network traffic involving websites or other sources considered susceptible to attack. The obtaining in step 400 may also be based on users of the client devices 104. For example, the network traffic of certain users or classes of users such as information technology (IT) managers or system administrators may or may not be monitored based on that user's status. For example, users having greater access to or control over an enterprise may have stricter monitoring requirements, as the potential threat posed to the enterprise by compromise of such a user or client device may be relatively large as compared to other types of users or client devices.

In step 402, the file obtained in step 400 is decoded to identify one or more code streams in the file. In some embodiments, decoding the file comprises identifying module stream names for respective ones of the code streams. The module stream names may comprise one or more stream names encoded utilizing a character set such as a Unicode character set including a character set not in the American Standard Code for Information Interchange (ASCII) character set. Code streams within a file utilize module stream names for unique identification. Typically, the code streams utilize well-known stream names encoded with the ASCII character set. Examples of such well-known stream names include *This Document*, *Module* 1, *Module* 2, *Module* 3, etc. Malware authors may create malware droppers internationally and utilize Unicode character sets to accommodate foreign languages. Decoding the file allows for a more comprehensive view of the code streams in the file regardless of the character set or sets used for the stream names. Without properly decoding various stream formats, analysis of the file is incomplete and thus the malware dropper detection module 120 may be "blind" to key portions of scripting logic utilized by a malware dropper.

The code streams identified in step 402 are processed in steps 404 and 406 to determine the presence of respective ones of a set of IOCs, such as IOCs 208. More particularly, in step 404 each of the identified code streams is de-obfuscated. Malware authors may use a layered approach to disguise or obfuscate the true intentions of malicious code. The first layer, as discussed above, may include using non-standard stream names such as Unicode stream names.

A second layer is to heavily obfuscate the logic of malicious code by pushing the limits of the scripting language used. For example, VBA code allows malware authors to place portions of malicious code into string variables and to reassemble the code into a runnable format at runtime and execute them. Thus, attempting to detect malware or malicious code by pattern matching is prone to failure because the scripts contained in these "strings" are so fragmented that it is difficult or impossible to identify any distinguishable patterns. Thus, step 404 involves identifying logic used to mask an original intent for a given code stream and reversing the logic to restore the original intent of the given code stream. In some embodiments, this includes reassembling fragmented strings to create a clear text code string.

In step 406, the de-obfuscated code streams are scanned to determine the presence of respective ones of a set of IOCs, such as IOCs 208. As discussed above, the IOCs correspond to techniques commonly used by malware droppers, or in some cases techniques that must be utilized by malware droppers. As one example, many malware droppers must be capable of downloading malware from the Internet, installing the malware to disk and executing the malware once it is installed. The use of IOCs, rather than hashes of previously seen malware droppers, provides for protection against zero-day malware droppers. It is to be appreciated, however, that in some embodiments signature-based detection using hashes of previously seen malware droppers may be used in addition to IOCs based on techniques commonly used by malware droppers. The processing in steps 404 and 406, and more generally the FIG. 4 process as a whole, does not require executing or opening a potentially malicious file.

In step 408, a determination is made as to whether the potentially malicious file is malicious. This determination is based on the presence of one or more of the IOCs checked for in step 406. It is important to note that the determination or classification of a file as malicious is intended to be construed broadly, and need not require determining that a file is "actually" malicious. For example, a file may be determined to be malicious if it is deemed high risk or likely to be malicious based on the presence of one or more IOCs without determining that the file is, in fact, a malicious file such as a malware dropper. In some embodiments, thresholds or detection mechanisms used by the malware dropper detection module 120 may be programmed to suit the needs of a particular entity. As such, two entities using the same set of IOCs may come to different conclusions regarding whether a particular file is malicious based on the thresholds utilized.

As discussed above, various ones of the IOCs 208 may utilize different weights based on the presence or absence of types of code, commands, ActiveX controls, etc. on whitelists or blacklists. Different ones of the IOCs 208 themselves may be assigned different weights altogether. In some embodiments, IOCs may be arranged in a hierarchy or scale from one or more relatively benign IOCs to one or more relative malicious IOCs. In the set of IOCs 208, for example, the IOCs 302 and 304 may be considered relatively benign and thus assigned relatively low weights, while the IOCs 306, 308 and 310 may be considered relatively malicious and thus assigned relatively higher weights. Determining that a file is malicious in step 408 may include determining whether a weighted total of the IOCs present in the code streams of the file exceeds a designated threshold. In other embodiments, individual IOCs may not be weighted, and determining that a file is malicious in step 408 may require detecting each of a set of IOCs or some subset of a set of IOCs.

In some embodiments, the scanning in step 406 involves checking for IOCs in an order defined by the hierarchy or scale. As an example, the scanning in step 406 may start by checking for relatively benign IOCs and progress through the more malicious IOCs in the hierarchy. A file may be determined to be malicious if a certain number or threshold of the relatively benign IOCs are detected even if none of the more malicious IOCs are detected. Alternatively, a file may be determined to be malicious if at least one of the more malicious IOCs are detected even if none of the relatively benign IOCs are detected. In some embodiments, the scanning in step 406 may only progress to a next IOC in the hierarchy if a previous IOC in the hierarchy is detected. As an example, if the scanning in step 406 does not detect any executable code in a potentially malicious file, the scanning may stop and conclude that the file is not malicious without checking for code with auto-launch capability, network download capability, etc. As another example, the set of IOCs scanned for in step 406 may be arranged in groups within a hierarchy. Detection of a file as malicious may require detecting the presence of at least one IOC in each of two or more groups of IOCs in the hierarchy. As an example, the set of IOCs may be grouped such that classifying a file as malicious requires detecting the presence of: (i) IOC 302; (ii) at least one of IOC 304 and IOC 306; and (iii) at least one of IOC 308 and IOC 310. It is to be appreciated that various other groupings and thresholds may be utilized in other embodiments.

Figure 4:
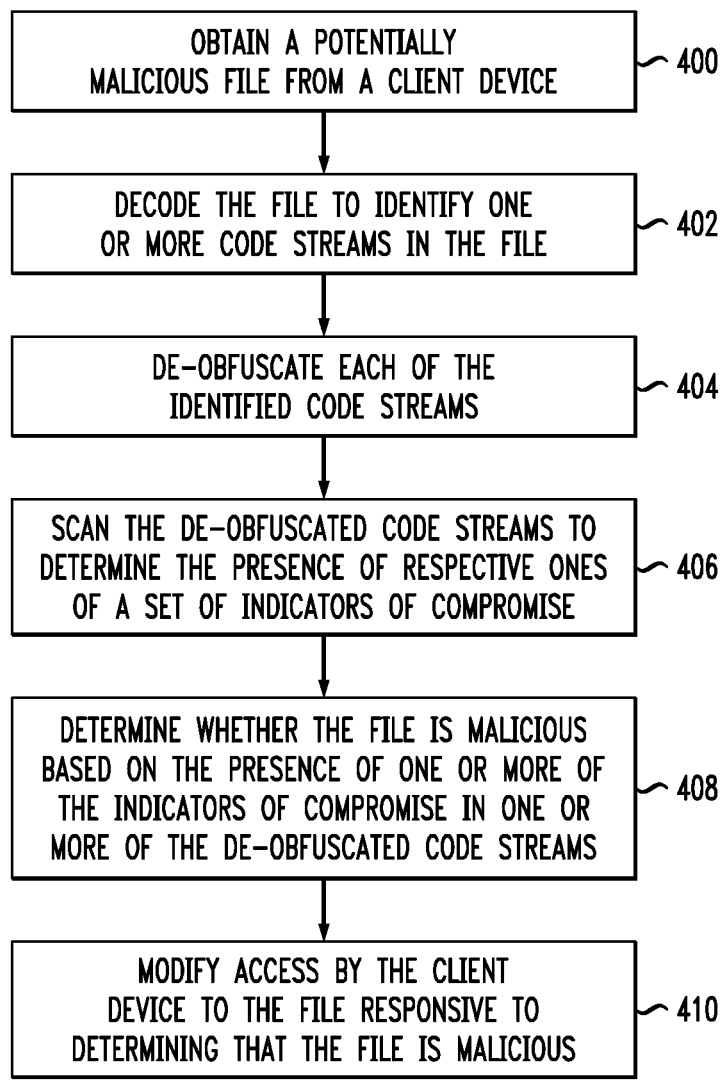
FIG. 4 is a flow diagram of an exemplary process for detection of malware droppers in an illustrative embodiment.

The FIG. 4 process continues with step 410, modifying access by the client device to the file responsive to determining that the file is malicious in step 408. The FIG. 4 process may be performed by malware dropper detection module 120 implemented in threat detection and remediation system 112 that is external to the client device. In other embodiments, the malware dropper detection module 120 may be implemented in whole or in part by the client device, such as one of client devices 104. Modifying access by the client device to the file in step 410 may, in some cases, comprise removing the file from a memory of the client device, preventing the client device from obtaining the file or storing the file in the first place, causing the file to be opened in a sandboxed or other protected application environment on the client device, etc.

Modifying access in step 410 may further include generating one or more notifications or alerts to send to the client device, to one or more network administrators or IT professionals associated with the enterprise, etc. Transmitting the alert or other notification to the client device may utilize one or more APIs of the client device permitting remedial actions to be taken, such as deleting or quarantining the file or causing a pop-up, icon or other warning to be displayed on a screen of the client device warning the user of the malicious file. Transmitting the alert or other notification to the network administrator or IT professional can allow such users to grant or deny access by the client device to the file after further review or analysis of the file.

In other embodiments, modifying access in step 410 may include requiring a user of the client device to authenticate in order to access the file. In this manner, certain classes of users may be permitted to access malicious files while others cannot. As an example, a class of users including IT professionals may benefit from access to the file so as to create additional user-defined IOCs or to refine thresholds used for detecting malicious files in the future.

An illustrative use case for detecting Microsoft® Office-based malware droppers will now be described in conjunction with FIGS. 5-13. It is to be appreciated, however, that embodiments are not limited solely to detecting Microsoft® Office-based malware droppers and that various features described below may be more generally utilized in detection of other types of malware droppers such as Flash-based malware droppers, standalone executable malware droppers and other document file malware droppers. Embodiments may also be utilized in detection of other types of malware in addition to malware droppers or more generally to check for malicious files.

Figure 5:
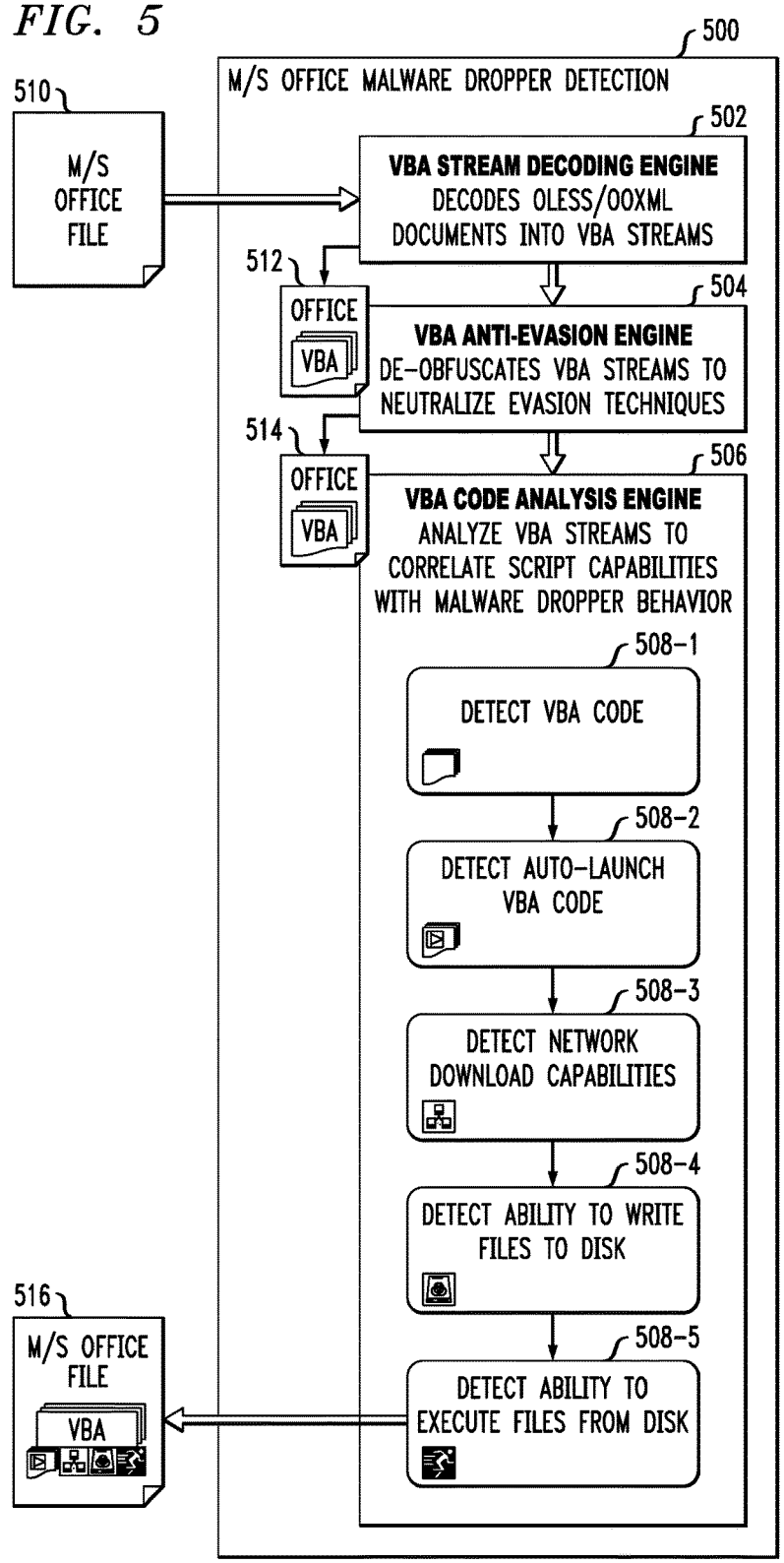
FIG. 5 is a block diagram of a Microsoft® Office malware dropper detection module in an illustrative embodiment.

FIG. 5 shows M/S (Microsoft®) Office malware dropper detection module 500, including VBA stream decoding engine 502, VBA anti-evasion engine 504 and VBA code analysis engine 506. The VBA stream decoding engine 502, VBA anti-evasion engine 504 and VBA code analysis engine 506 will be described in turn below.

Microsoft® Office documents are capable of hosting code module streams comprised of VBA scripts. Such code streams have module stream names uniquely identifying them. As discussed above, streams typically utilize well-known stream names encoded with the ASCII character set. Malware authors increasingly create malware droppers internationally and thus stream names may begin to utilize Unicode character sets to accommodate foreign languages. FIG. 6 shows an example of pseudocode 600 where the first three streams have names utilizing Unicode characters indicating that such streams were authored using the Cyrillic language set. The VBA stream decoding engine 502 decodes VBA streams regardless of the character set used for the stream name, thus providing a comprehensive view of all VBA code for further analysis in the VBA anti-evasion engine 504 and VBA code analysis engine 506. For example, the VBA stream decoding engine 502 receives M/S office file 510, which may take the form of an OLESS or OOXML document, and decodes the M/S office file 510 into VBA streams 512. The VBA streams 512 are provided to the VBA anti-evasion engine 504. In some embodiments, the use of non-standard stream names may be considered as an IOC.

As described above, malware authors may utilize a layered approach to disguise or obfuscate the true or original intent of malicious code. The use of Unicode stream names is one such layer. Code obfuscation is another such layer, wherein the original intent of a code stream is obfuscated. This obfuscation may occur by pushing the limits of a scripting language. In the case of VBA code, this may involve placing portions of code into string variables that are reassembled into a runnable format at runtime and executed. The VBA anti-evasion engine 504 can analyze VBA code and neutralize these and other evasion techniques. In some embodiments, the VBA anti-evasion engine 504 scans VBA code for common obfuscation techniques and reverses the logic of such obfuscation to restore the original intent of the code stream. As an example, if a malware author obfuscates code into fragmented strings, the VBA anti-evasion engine 504 programmatically reassembles the code fragments to create more readable or clear text strings. FIG. 7 illustrates an example of de-obfuscation, where pseudocode 700 is an example of VBA code obfuscated to avoid detection. Pseudocode 702 shows a cleansed version of the malicious pseudocode 700 after de-obfuscation by the VBA anti-evasion engine 504. VBA anti-evasion engine 504 thus takes in potentially obfuscated VBA streams 512, scans the VBA streams 512, and provides de-obfuscated VBA streams 514 to VBA code analysis engine 506. In some embodiments the use of code obfuscation may be considered as an IOC.

VBA code analysis engine 506 is designed to confidently detect zero-day M/S Office malware droppers by scanning embedded VBA code of M/S office file 510 for techniques that are commonly utilized by malware droppers, rather than maintaining hashes of previously seen malware samples for signature-based detection of malware droppers. In some embodiments, however, signature-based detection may be utilized as a supplement to checking for techniques commonly utilized by malware droppers.

Figure 8:
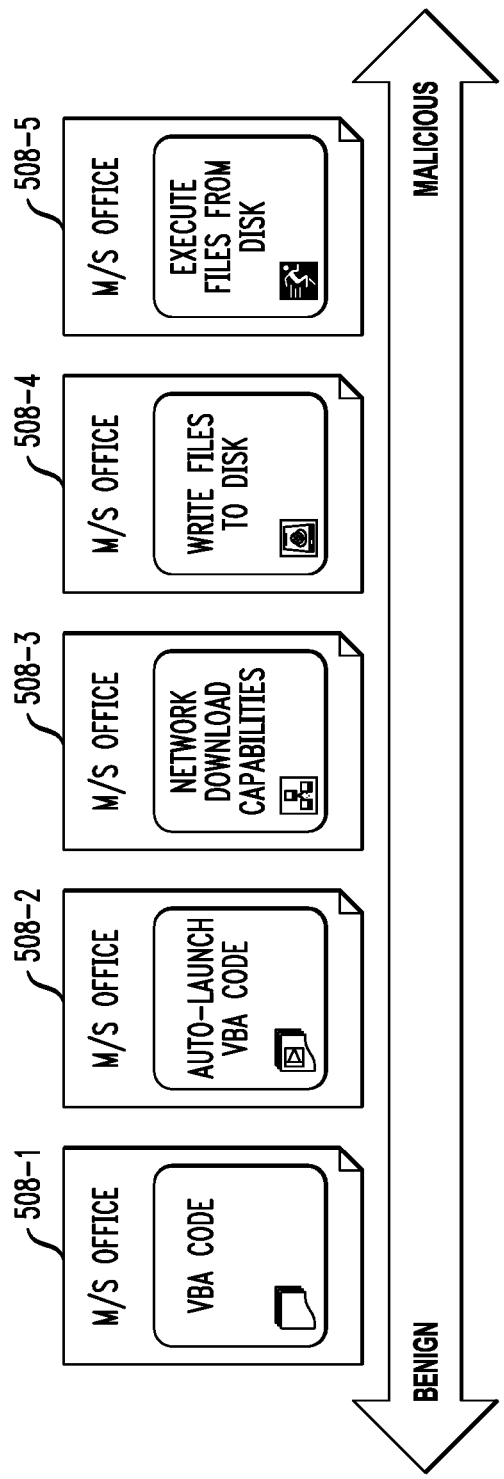
FIG. 8 shows a hierarchy of the indicators of compromise used in the code analysis engine of FIG. 5.

In the FIG. 5 embodiment, the VBA code analysis engine particularly considers five IOCs denoted 508-1, 508-2 508-3, 508-4 and 508-5. As shown in FIG. 8, these IOCs may be arranged in a hierarchy or scale from relatively benign IOCs to relatively malicious IOCs. In some embodiments, the M/S office file 510 is determined to be malicious only after determining that each of the five IOCs 508 is found, as shown in the malicious M/S office file 516 output by VBA code analysis engine 506. In other embodiments, other thresholds may be used for determining whether M/S office file 510 is malicious, such as detecting the presence of some but not all of the IOCs 508, detecting a threshold number of IOCs 508, assigning weights to different ones of the IOCs 508 and checking whether a weighted total of the IOCs detected in M/S office file 510 exceeds a designated threshold, etc.

Each of the IOCs 508 will be described in turn below. IOC 508-1 checks for the presence of VBA code in the de-obfuscated code streams 514. The presence of VBA code may raise suspicion and trigger IOC 508-1. FIG. 9 shows an example 900 of an IOC that detects the presence of VBA code. As shown in FIG. 9, the IOC 508-1 is not a high confidence IOC as reflected in the FIG. 8 hierarchy where IOC 508-1 is on the more benign side of the scale. It is to be appreciated, however, that in other embodiments IOC 508-1 may be designated as a high confidence IOC by changing one or more settings in configuration files or rules syntax causing the value of the "highConfidence" value to change from "false" to "true." The configuration files, rules syntax or other logic which triggers IOCs may be stored in a database such as attack database 108. In a similar manner, other ones of the IOCs 508 to be described below may be designated as high confidence or low confidence by adjusting settings in configuration files or rules syntax controlling the value of the "highConfidence" variable.

IOC 508-2 checks the de-obfuscated code streams 514 for code with auto-launch capability. This may include checking for a known set of commands, such as but not limited to Auto_Open(), Workbook_Open(), Document_Open() etc. Such commands allow a VBA script to automatically launch code when the M/S office file 510 is opened, without user intervention or knowledge. FIG. 10 shows an example 1000 of an IOC that detects code with auto-launch capability. As shown in FIG. 10, the IOC 508-2 is not a high confidence IOC as reflected in the FIG. 8 hierarchy where IOC 508-2 is on the more benign end of the scale. IOC 508-3 checks the de-obfuscated code streams 514 for network download capabilities.

In some embodiments, this includes checking for the presence of ActiveX controls such as Microsoft.XMLHTTP, MSXML2.XMLHTTP, etc. In other embodiments, the logic of IOC 508-3 may check for other types of code such as VBA functions relating to network download capabilities. The presence of such ActiveX controls, VBA functions or other code indicate that the M/S office file 510 is capable of downloading content from the Internet or another network. FIG. 11 shows an example 1100 of IOC 508-3 that detects network download capabilities. As shown in FIG. 11, the IOC 508-3 is a high confidence IOC as reflected in the FIG. 8 hierarchy where IOC 508-3 is on the more malicious end of the scale. The particular example 1100 not only identifies the presence of IOC 508-3, but also may identify the particular source malware sample that a dropper is attempting to install, e.g., o97i76u54.exe in the FIG. 11 example.

IOC 508-4 checks the de-obfuscated code streams 514 for code with the ability to write files to disk or memory. In some embodiments, this includes checking for the presence of ActiveX controls such as Adodb.Stream, VBA functions or other code which can be used to read from or write content to a disk or other memory. FIG. 12 shows an example 1200 of an IOC that detects code with the ability to write files to disk or memory. As shown in FIG. 12, the IOC 508-4 is a high confidence IOC as reflected in the FIG. 8 hierarchy where IOC 508-4 is on the more malicious end of the scale.

IOC 508-5 checks the de-obfuscated code streams 514 for code with the ability to execute a file from disk or memory. This may include checking for the presence of ActiveX controls that allow programs to be started, such as Shell.Application, or other VBA functions or code. FIG. 13 shows an example 1300 of an IOC that detects code with the ability to execute a file from disk or memory. As shown in FIG. 13, the IOC 508-5 is a high confidence IOC as reflected in the FIG. 8 hierarchy where IOC 508-5 is on the more malicious end of the scale.

It is to be appreciated that the specific IOCs 508 used by M/S office malware dropper detection module 500 are presented by way of example only. Embodiments are not limited solely to use with the specific IOCs 508 shown in FIG. 5. In addition, embodiments need not utilize all of the IOCs 508 shown in FIG. 5. Further, the particular examples shown in FIGS. 6, 7 and 9-13 are presented by way of illustrative example. Various other types of code and IOCs may be used in addition to or as alternatives to the specific examples given and described herein.

Various embodiments described herein provide a number of advantages. For example, some embodiments provide for automatic analysis of potentially malicious files by statically analyzing the potentially malicious files or portions thereof without requiring a user or device to run, open or execute the potentially malicious files. As another example, some embodiments are extremely successful at detecting zero-day malware droppers by utilizing carefully tailored IOCs identifying techniques commonly used by malware droppers such as the ability to download content from the Internet, the ability to install other files to disk and the ability to launch downloaded and installed files. Thus, some embodiments allow for the identification of malware droppers and other potentially malicious files without requiring such files to be previously identified and added to a signature-based detection scheme.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of network security systems, modules, notifications, alerts and other features can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising:
    obtaining a potentially malicious file;
    decoding the file to identify one or more code streams;
    processing each of the identified code streams to determine the presence of respective ones of a set of indicators of compromise;
    determining whether the file is malicious based at least in part on the presence of one or more of the indicators of compromise in the code streams; and
    modifying access by a given client device to the file responsive to determining that the file is malicious;
    wherein the set of indicators of compromise are arranged in a hierarchy from one or more relatively benign indicators of compromise to one or more relatively malicious indicators of compromise;
    wherein processing each of the identified code streams to determine the presence of respective ones of the set of indicators of compromise comprises checking for the presence of respective ones of the set of indicators in an order determined based at least in part on the hierarchy; and
    wherein the method is performed by at least one processing device comprising a processor coupled to a memory.

2. The method of claim 1 wherein the processing device comprises a network security system configured to communicate with a plurality of client devices, including the given client device, over at least one network.

3. The method of claim 1 wherein the file comprises one of an Object Linking and Embedding Structure Storage (OLESS) document and an Office Open Extensible Markup Language (OOXML) document and at least one of the code streams comprises a Visual Basic for Application (VBA) scripting stream.

4. The method of claim 1 wherein decoding the file comprises identifying one or more module stream names for respective ones of the code streams.

5. The method of claim 4 wherein at least one of the module stream names comprises a stream name encoded utilizing a character set other than an American Standard Code for Information Interchange (ASCII) character set.

6. The method of claim 1 wherein processing each of the identified code streams comprises de-obfuscating a given one of the code streams without executing the given code stream by:
    identifying logic used to mask an original intent for the given code stream; and
    reversing the logic to restore the original intent of the given code stream.

7. The method of claim 6 wherein the logic masks the original intent for the given code stream by obfuscating portions of code into fragmented strings, and reversing the logic comprises reassembling the fragmented strings to create a clear text code string.

8. The method of claim 1 wherein the indicators of compromise comprise two or more of:
    a first indicator of compromise that checks for one or more designated types of code;
    a second indicator of compromise that checks for code with auto-launch capability;
    a third indicator of compromise that checks for code with network download capability;
    a fourth indicator of compromise that checks for code with the ability to read from or write to memory; and a fifth indicator of compromise that checks for code with the ability to execute one or more other files from memory.

9. The method of claim 8 wherein:
the first indicator of compromise checks for the presence of Visual Basic for Application (VBA) code;
the second indicator of compromise checks VBA scripts for commands to automatically launch code when the file is opened without user intervention or knowledge;
the third indicator of compromise checks for a set of VBA functions and ActiveX controls indicating that the file is capable of downloading content from a network;
the fourth indicator of compromise checks for a set of VBA functions and ActiveX controls used to read from or write content to the memory; and
the fifth indicator of compromise checks for a set of VBA functions and ActiveX controls that allow programs to be started.

10. The method of claim 8 wherein different ones of the indicators of compromise are assigned different weights, and determining whether the file is malicious comprises determining whether a weighted total of the indicators of compromise present in the one or more code streams exceeds a designated threshold.

11. The method of claim 10 wherein the first indicator of compromise and the second indicator of compromise are assigned lower weights relative to the third indicator of compromise, the fourth indicator of compromise and the fifth indicator of compromise.

12. The method of claim 8 wherein determining whether the file is malicious comprises determining that the first, second, third, fourth and fifth indicators of compromise are present in a given one of the one or more code streams.

13. The method of claim 8 wherein the set of indicators of compromise further comprise one or more user-defined indicators of compromise.

14. The method of claim 1 wherein modifying access by the client device to the file comprises at least one of:
removing the file from a memory of the client device;
preventing the client device from obtaining the file; and
causing the file to be opened in a sandboxed application environment on the client device.

15. A computer program product comprising a non-transitory processor-readable storage medium having stored therein program code of one or more software programs, wherein the program code when executed by a processing device cause the processing device:
to obtain a potentially malicious file;
to decode the file to identify one or more code streams;
to process each of the identified code streams to determine the presence of respective ones of a set of indicators of compromise;
to determine whether the file is malicious based at least in part on the presence of one or more of the indicators of compromise in the code streams; and
to modify access by a given client device to the file responsive to determining that the file is malicious;
wherein the set of indicators of compromise are arranged in a hierarchy from one or more relatively benign indicators of compromise to one or more relatively malicious indicators of compromise; and
wherein processing each of the identified code streams to determine the presence of respective ones of the set of indicators of compromise comprises checking for the presence of respective ones of the set of indicators in an order determined based at least in part on the hierarchy.

16. The computer program product of claim 15 wherein the indicators of compromise comprise two or more of:
a first indicator of compromise that checks for one or more designated types of code;
a second indicator of compromise that checks for code with auto-launch capability;
a third indicator of compromise that checks for code with network download capability;
a fourth indicator of compromise that checks for code with the ability to read from or write to memory; and
a fifth indicator of compromise that checks for code with the ability to execute one or more other files from memory.

17. An apparatus comprising:
a processing device comprising a processor coupled to a memory;
the processing device being configured:
to obtain a potentially malicious file;
to decode the file to identify one or more code streams;
to process each of the identified code streams to determine the presence of respective ones of a set of indicators of compromise;
to determine whether the file is malicious based at least in part on the presence of one or more of the indicators of compromise in the code streams; and
to modify access by a given client device to the file responsive to determining that the file is malicious;
wherein the set of indicators of compromise are arranged in a hierarchy from one or more relatively benign indicators of compromise to one or more relatively malicious indicators of compromise; and
wherein processing each of the identified code streams to determine the presence of respective ones of the set of indicators of compromise comprises checking for the presence of respective ones of the set of indicators in an order determined based at least in part on the hierarchy.

18. The apparatus of claim 17 wherein the indicators of compromise comprise two or more of:
a first indicator of compromise that checks for one or more designated types of code;
a second indicator of compromise that checks for code with auto-launch capability;
a third indicator of compromise that checks for code with network download capability;
a fourth indicator of compromise that checks for code with the ability to read from or write to memory; and
a fifth indicator of compromise that checks for code with the ability to execute one or more other files from memory.

19. The method of claim 1 wherein checking for the presence of the respective ones of the set of indicators in the order determined based at least in part on the hierarchy comprises:
checking for the presence of the one or more relatively benign indicators of compromise;
progressing with checking for the presence of the one or more relatively malicious indicators of compromise responsive to detecting the presence of the one or more relatively benign indicators of compromise; and
refraining from checking for the presence of the one or more relatively malicious indicators of compromise responsive to failure to detect the presence of the one or more relatively benign indicators of compromise.

20. The method of claim 1 wherein the indicators of compromise are arranged in two or more groups within the hierarchy, and wherein checking for the presence of respective ones of the set of indicators in the order determined based at least in part on the hierarchy comprises checking for the presence of at least one indicator of compromise in each of the two or more groups within the hierarchy.

* * * * *